United States Patent [19]

Cok

[11] Patent Number: 5,495,618
[45] Date of Patent: Feb. 27, 1996

[54] SYSTEM FOR AUGMENTING TWO DIMENSIONAL DATA SETS IN A TWO DIMENSIONAL PARALLEL COMPUTER SYSTEM

[75] Inventor: Ronald S. Cok, Rochester, N.Y.

[73] Assignee: Eastman Kodak Company, Rochester, N.Y.

[21] Appl. No.: 935,499

[22] Filed: Aug. 26, 1992

[51] Int. Cl.⁶ .............................. G06F 15/16; G06F 9/00; G06F 9/30
[52] U.S. Cl. .................... 395/800; 395/200.01; 395/280; 364/DIG. 1
[58] Field of Search ............................ 364/200; 395/200, 395/325, 800, 200.07, 280

[56] References Cited

U.S. PATENT DOCUMENTS

| | | | |
|---|---|---|---|
| 4,855,903 | 8/1989 | Carleton et al. | 364/200 |
| 4,942,517 | 7/1990 | Cok | 364/200 |
| 4,951,193 | 8/1990 | Muramatsu et al. | 364/200 |
| 4,964,032 | 10/1990 | Smith | 364/200 |
| 4,992,933 | 2/1991 | Taylor | 364/200 |
| 5,072,371 | 12/1991 | Benner et al. | 395/200 |
| 5,083,265 | 1/1992 | Valiant | 395/800 |
| 5,157,785 | 10/1992 | Jackson et al. | 395/800 |
| 5,226,125 | 7/1993 | Balmer et al. | 395/325 |

FOREIGN PATENT DOCUMENTS

| | | |
|---|---|---|
| 0109337 | 5/1984 | European Pat. Off. . |
| 0392184 | 10/1990 | European Pat. Off. . |

OTHER PUBLICATIONS

Aaron M. Tenebaum, Moshe J. Augenstein, "Data Structures Using Pascal" © 1991, pp. 207–208, 218, 236, 240–241, Prentice–Hall, Inc.

*Primary Examiner*—Thomas C. Lee
*Assistant Examiner*—Felicia Ives
*Attorney, Agent, or Firm*—Thomas H. Close

[57] ABSTRACT

A method and apparatus for exchanging data between neighboring mesh connected processors in which a first stage exchanges locally stored data with each of the four neighbor processors, and then a second stage exchanges the data just received from each processor with a different one of the same four processors. The mesh connection does not provide connections between processors in a diagonal direction. The first set of exchanges provides data from the processors on the left, right, above, and below which augments the local data tile on the corresponding side. The second set of exchanges provides the data from neighbors in the upper left corner, the upper right corner, the bottom right corner, and the bottom left corner in a transfer from the processors above, right, below and left, respectively. During the exchanges data pointers move in a direction opposite to the direction of data flow.

11 Claims, 10 Drawing Sheets

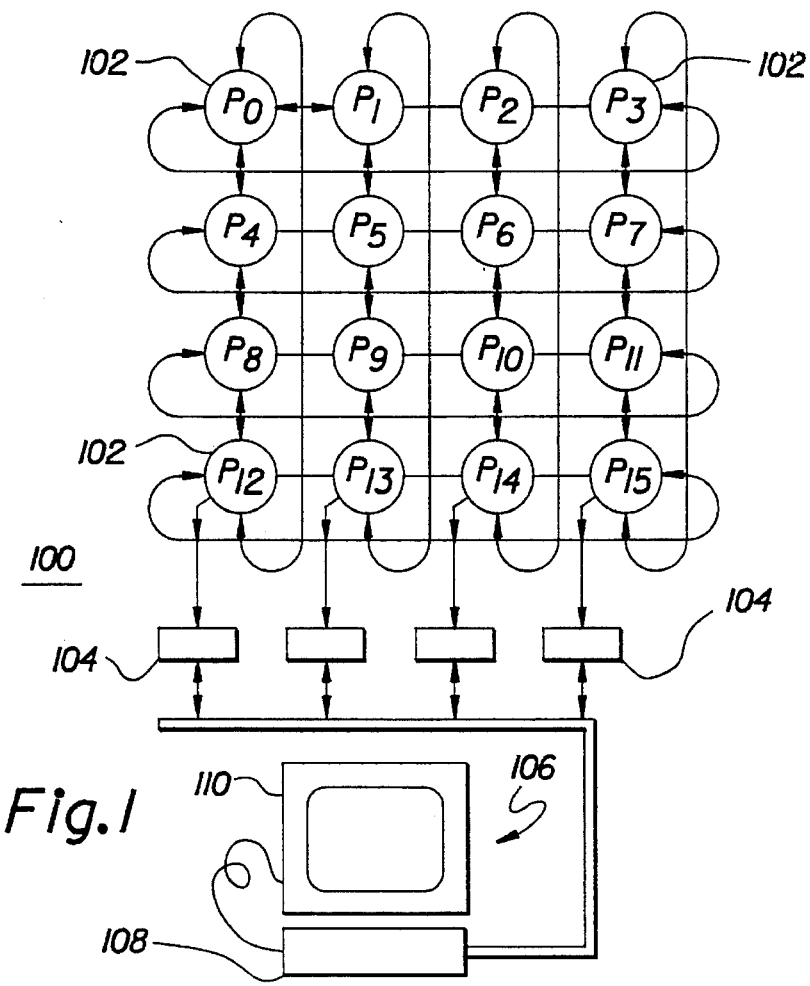

SYSTEM FOR AUGMENTING TWO DIMENSIONAL DATA SETS IN A TWO DIMENSIONAL PARALLEL COMPUTER SYSTEM

BACKGROUND OF THE INVENTION

1. Field of the Invention

The present invention is directed to a system for exchanging data between processors or computers operating in parallel and connected in an array and, more particularly, to a system in which local two dimensional data sets or tiles in each processor are augmented by some portion of the two dimensional tiles of the neighboring processors in a first exchange in which tiles on the right and left, and above and below are exchanged followed by a second exchange which causes diagonally positioned tile data to be received and stored by each processor.

2. Description of the Related Art

Distributed-memory parallel computers are an efficient solution for many computing problems. These computers utilize multiple processors, each of which have a separate, local memory which is not accessible to any other processor. The processors can communicate with each other through interprocessor communication links. The number of processors in such a computer can often be extended without limit. However, the performance of such a computer is limited by the effort of communicating information between the processors so that, at some point, the performance of a large computer with many processors will be constrained by the interprocessor communication bandwidth.

Such computers are most efficient when computing on data sets which are distributed over the various processors and which do not require much communication. Mesh or toroidally connected parallel computers are especially effective when processing two-dimensional data sets, such as images. A typical image processing operation is image convolution. Typically, each data set is divided into mutually exclusive, two-dimensional subsets, each of which is stored in one processor. The two dimensional data subsets, or tiles, are allocated to the processors in such a way as to place contiguous tiles into contiguous processors.

Since a mesh or toroidally connected parallel computer is locally connected, this arrangement of data is very cost effective for operations which are local in nature. Point operations, of course, do not require any interprocessor communication since each data element is processed alone. Operations which utilize neighborhoods, such as convolutions, are more complex. Because each processor stores a mutually exclusive data set, part of the neighborhood for data elements on the edge of the local tile is stored in a neighboring processor. These neighboring data elements must be exchanged between processors to perform the neighborhood operation. Since these data exchanges represent overhead in the parallel computer, it is important to optimize the interprocessor communication necessary to implement the data exchange.

One convenient method for providing the necessary data to support neighborhood operations is to augment the local tiled data subsets with data normally stored in neighboring processor tiles. It is only necessary to exchange data between processors once to augment the data tiles. This is an especially effective approach because the data for all edge neighborhoods are available in the augmented tile and precludes the need for multiple communications. The augmented data must be stored in more than one processor, so that the penalty for reduced communication is increased data storage. However, if the tiled data itself is changed as a result of some operation, and a successive neighborhood operation is to be performed with the same data, the augmentation must be repeated so that the augmented data is changed as well.

It is also important to maintain a consistent data storage structure for the augmented data. Two dimensional data is typically stored in a two dimensional data structure; the augmented data should be placed within this data structure so as to reduce any processor overhead in accessing the data.

SUMMARY OF THE INVENTION

An object of this invention is to provide a consistent and complete methodology for augmenting two dimensional data tiles within a mesh-connected parallel computer in such a way as to optimize the interprocessor bandwidth while maintaining consistency with the typical data storage structures.

Another object of the present invention is to provide a simple two-stage data exchange that will operate for two or higher dimensional data sets.

It is also an object of the present invention to orient the direction of pointer movements during the first exchange so that the pointers are in proper positions for each step of the exchange and do not have to be corrected after each step.

The above objects are achieved by a method for exchanging data between neighboring mesh connected processors which, in a first stage, exchanges locally stored data with each of the four neighbor processors, and then, in a second stage, exchanges the foreign data just received from each processor with a different one of the same four processors. The first set of exchanges provides data from the processors on the left, right, above, and below which augments the local data tile on the corresponding side. The second set of exchanges provides the data corresponding to the upper left corner, the upper right corner, the bottom right corner, and the bottom left corner of the augmented data tile from the processor above, the right, below and the left respectively. The vertical exchanges are done row wise (in groups of rows), while the horizontal exchanges are done column wise (in groups of columns), assuming a two dimensional data storage structure whose representation is oriented in the same way as the representation of the proceesor network. During the exchanges the output pointers move across the data set away from the neighbor to which the data is output and the input pointers move toward the neighbor from which the data is received, that is, the pointers move in a direction opposite the data flow. The first stage of exchanges can include multiple steps in which data from remote processors that are not neighbors are obtained by each processor.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 depicts a computer 100 in which the method of the present invention is implemented;

FIGS. 2a and 2b depict an eight by eight data array and the array distributed over a four by four processor array such as depicted in FIG. 1;

FIG. 3 visually depicts the storage requirements for each processor in FIG. 2b which is sufficient to allow single element augmentation of local data sets;

FIG. 4 depicts data distribution after single element augmentation;

FIG. 5 depicts augmentation of the local data set for processor $P_5$ of FIG. 1 by three data elements in each direction two of which are from a neighbor processor and one from a remote processor;

FIG. 9 depicts the augmentation after the first stage of the exchange when a two step exchange is performed;

DESCRIPTION OF THE PREFERRED EMBODIMENTS

Figure 6:
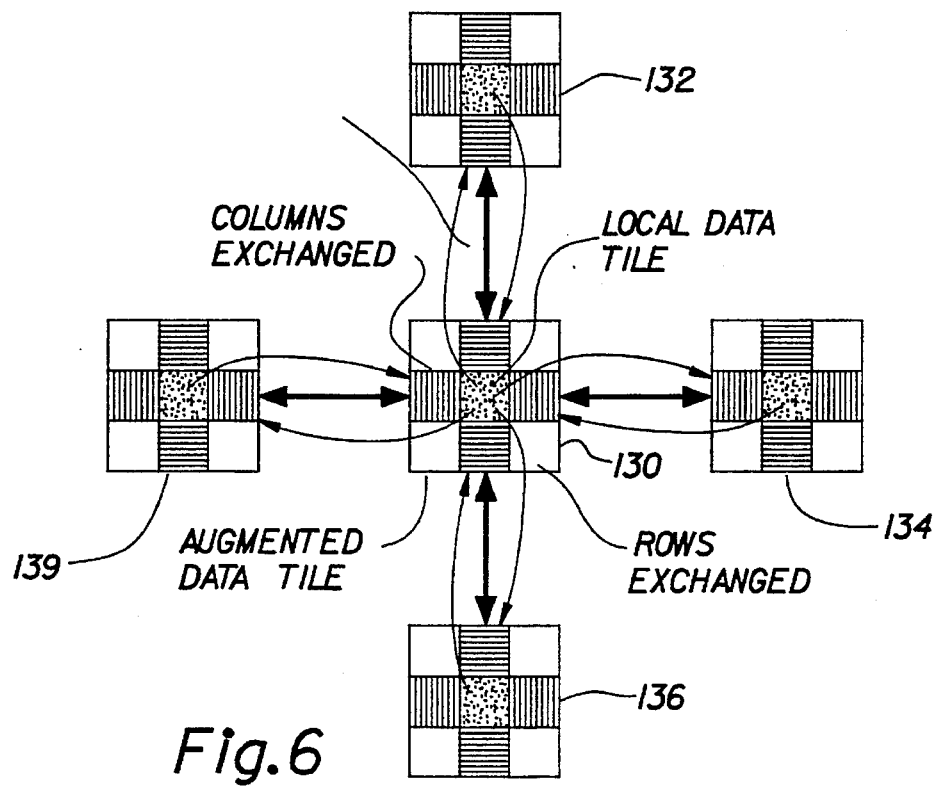
FIG. 6 illustrates data set sources and destinations for a first stage of augmentation.

This invention concerns a method for communicating distributed data within a mesh connected parallel processor array so that each local data tile is augmented with a border of data from its neighbors. The method requires no intermediate storage and optimizes the use of the interprocessor links.

A mesh-connected parallel computer 100 is shown in FIG. 1. In FIG. 1, 16 processors $P_0$–$P_{15}$ are arranged in a four by four array with each processor 102 connected to its neighbor on the left, right, top and bottom. Processors 102 on the edge of the array, are connected to their counterparts on the opposite side of the array to form a complete toroid so that, for example, processor $P_0$ is connected to processors $P_3$ and $P_{12}$ as well as $P_1$ and $P_4$. The processors 102 are loaded with the mutually exclusive, two dimensional data sets or tiles through interfaces 104 by a computer system 106 including a processor 108 and a display 110. Each processor or processing system 102 is comprised of a main processor with an associated main memory which together perform the desired operation, such as image convolution, and at least four and preferably eight direct memory access (DMA) channels or processors which independently access the main memory during transfers over the interprocessor connections. As each processor 102 an appropriate single chip computer is available from INMOS Ltd. Co. of Bristol, U.K. as the Inmos Transputer. The details of this computer 100 can be found in U.S. Pat. No. 4,942,517 incorporated by reference herein.

A sample distribution of two dimensional data over this parallel computer is shown in FIGS. 2a and 2b. Each data element in the data set is sequentially numbered. Each subset or tile, such as the tile of processor $P_0$, is stored contiguously, so that, for example, processor $P_0$ will have elements 0, 1, 8, and 9 stored consecutively in its memory. The elements could also be stored in an array to match the data set arrangement. This structure provides a two dimensional array for the local data tile. For convenience, the entire data set of elements 0–63 will be called the data set and the subset of elements stored in each processor will be called a data subset or a tile. However, it is possible to call each group of elements or tile stored by a processor a local data set.

Figures 3, 5, 9:
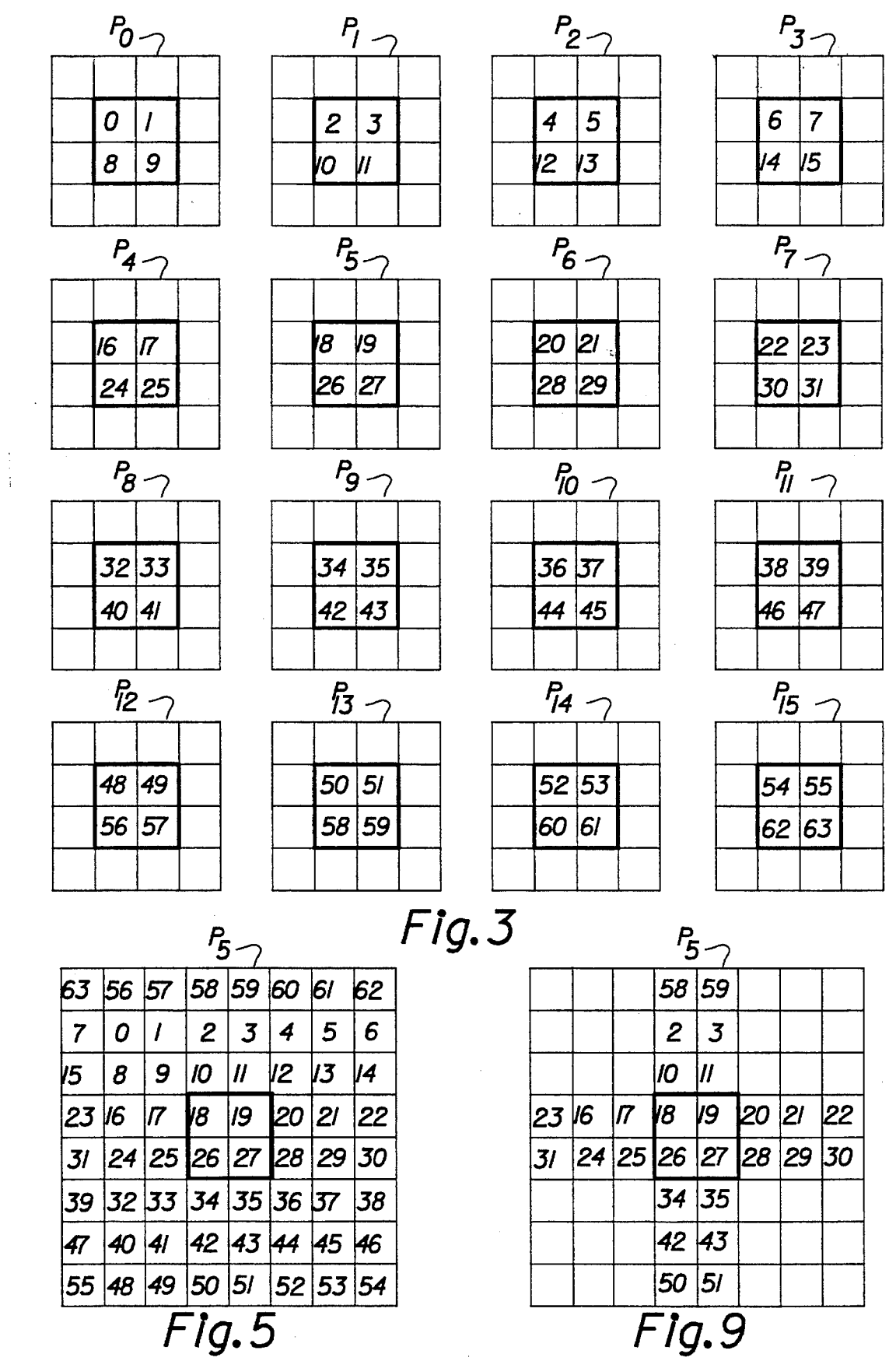
Figure 4:
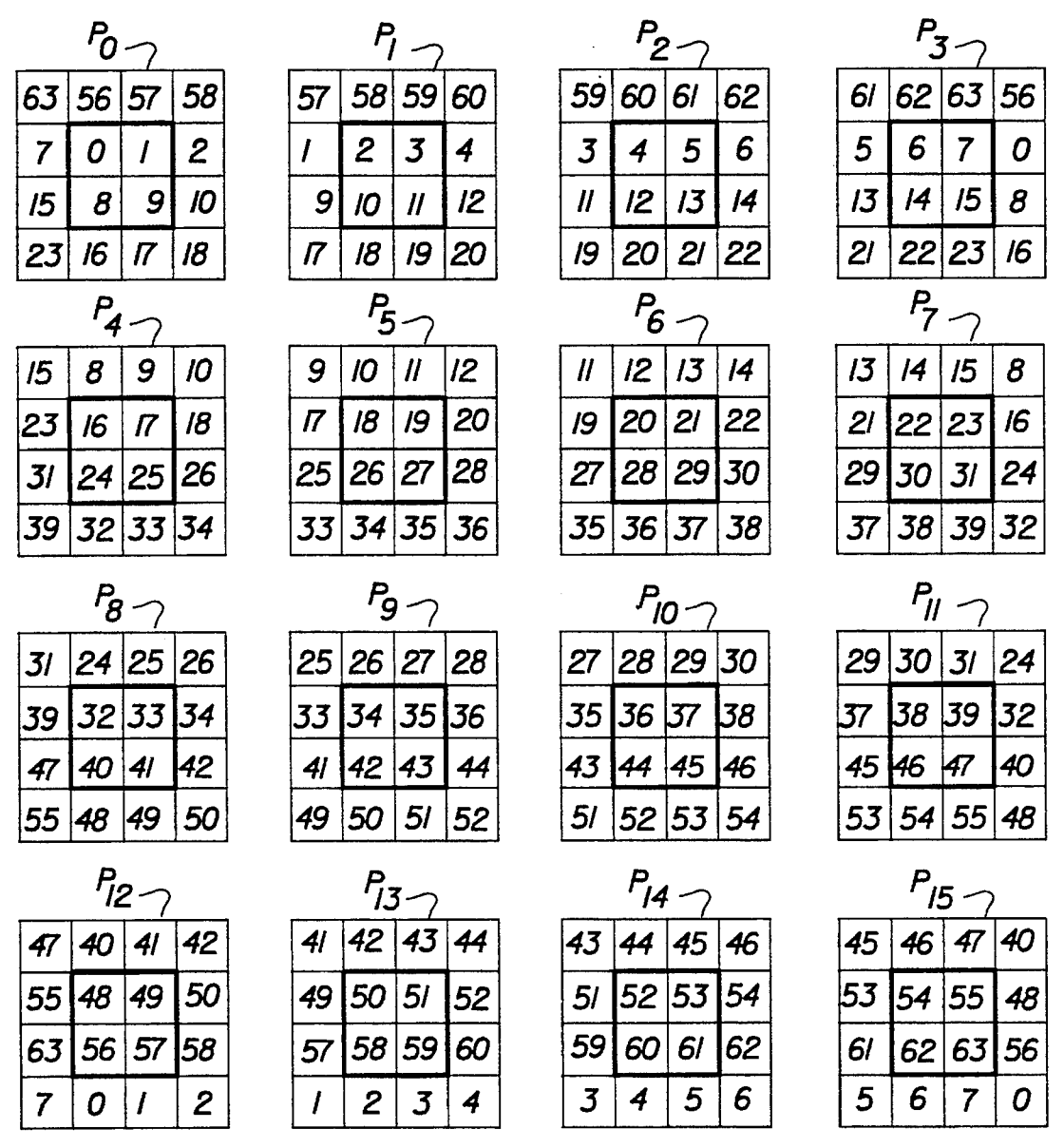

To augment each tile, additional memory must be allocated within each processor to store the data elements received from the processor's neighbors. Also for convenience the group of elements originally stored in a processor prior to augmentation will be called the local data subset while subsets transferred from other processors to the local processor will be called foreign data subsets. The subsets transferred from the adjacent neighbors, where the adjacent neighbors of processor $P_2$ are $P_1$, $P_5$, $P_6$, $P_7$, $P_3$, $P_{15}$, $P_{14}$ and $P_{13}$, are called adjacent foreign subsets. The additional storage needed is shown in FIG. 3, for a one element overlap of redundant data in each direction, and is represented by empty boxes. The present invention exchanges the necessary data between processors with optimal efficiency to store the appropriate data in each tile. Note that the augmented data tile is contiguously allocated. The original data set is no longer, by itself contiguous. Thus, if in some system the original tiled data is stored contiguously, it must be copied to an augmented memory area. FIG. 4 illustrates the foreign data elements stored in each augmented tile of each processor after all of the necessary interprocessor data exchanges have taken place. The original or local data elements are bordered by a thick border.

FIG. 5 illustrates a data tile augmented by three elements on each side for processor $P_5$. It is important to note that each original data tile had only two elements in each dimension. Thus an overlap of three elements in this case means that data must be obtained from a processor which is not an immediate neighbor. These processors that are not immediate neighbors are called remote processors and the data sets from these remote processors are called remote foreign subsets. In this example, processor $P_5$ obtains data from remote processors $P_7$, $P_{13}$ and $P_{15}$ which are not immediate neighbors of processor $P_5$. Any method for implementing the necessary data exchanges must include provisions for cases such as these in which data must ultimately be transferred from remote processors. Indeed, it is possible that the data overlap may be larger than the original data set, so that the overlapped data within a given processor will wrap around to include elements from the local tile itself. If this happens in both a horizontal and a vertical direction, the local tile will be augmented to include the entire data set so that each processor will include the whole data set. FIG. 5 also illustrates this situation.

The data exchange method of the present invention will be described first for a data set and overlap which does not require data to be obtained from remote processors. The method described is then easily extended to handle the arbitrary case in which a data set of any size is augmented by an arbitrary amount.

Figure 7A:
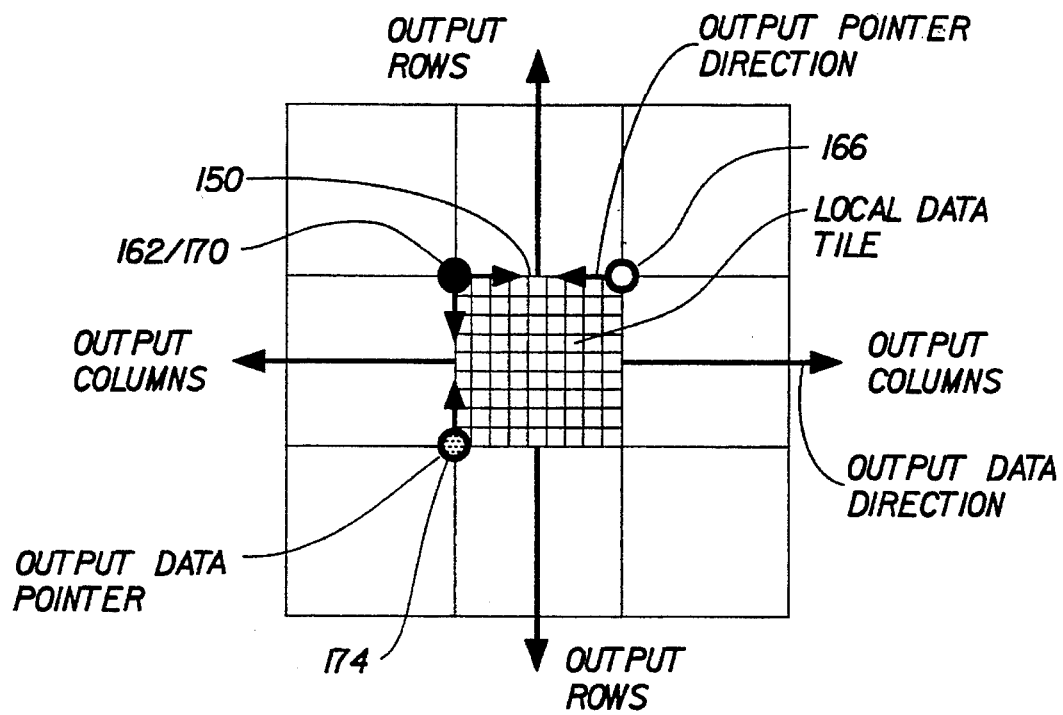
FIGS. 7a and 7b depict output and input pointer movement and initial positions before the first stage exchange.
Figure 7B:
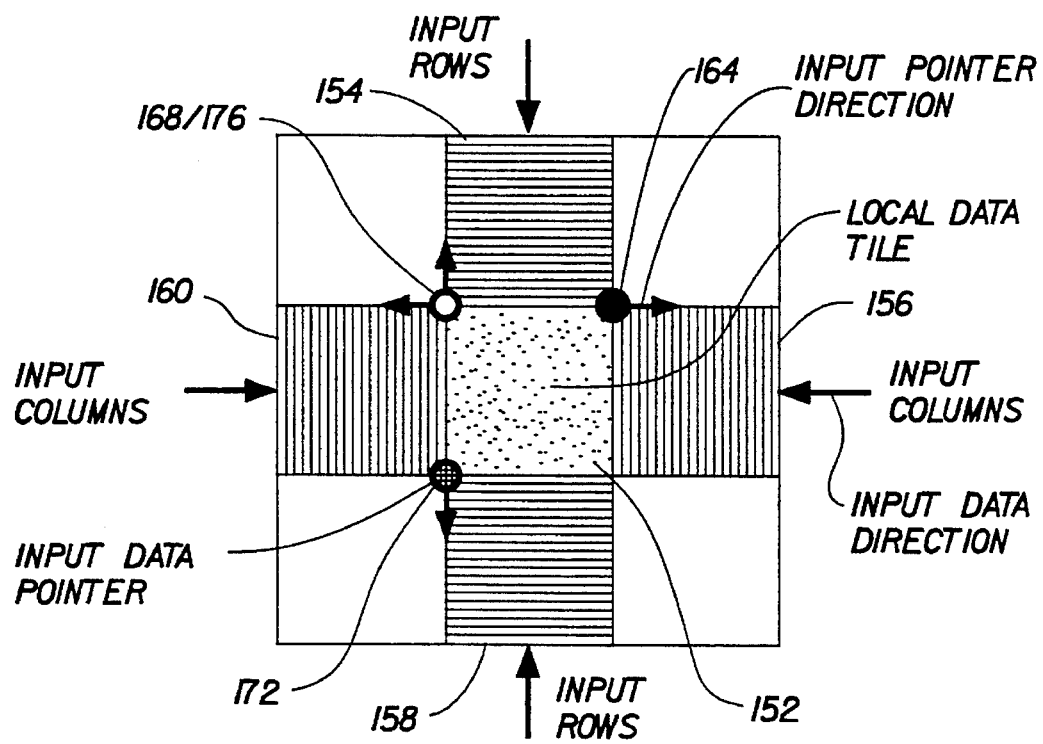

The method is divided into two stages. In the first stage, each processor exchanges data with the immediate neighbor, so as to build up a cross-shaped area of valid data (when represented two dimensionally). FIG. 6 shows a processor 130 and its four neighbors 132, 134, 136 and 139 exchanging data. The dotted area represents the original local tile data in each processor, the data area shown with vertical bars represents data that is obtained from a neighbor on the left or right and the data area shown with horizontal bars represents data that is obtained from a neighbor above or below and also represents whether partial rows or columns are obtained. The empty corners will be filled in at the second stage. The horizontal exchanges are done column wise, that is, each entire column is transferred or received before the column pointer is updated while the vertical exchanges are done row wise, that is, each entire row is transferred or received before the row pointer is updated. A simple mechanism for controlling these exchanges is to use column pointers (for the horizontal exchanges) and row pointers (for the vertical exchanges). These pointers are shown in FIGS. 7a and 7b, for both input and output respectively and the arrows indicate pointer movement direction. Note that to avoid deadlock, the input corresponding to every output must be executed concurrently with the output. This is accomplished in the preferred computer system by direct memory access (DMA) transfers performed by the independent data transfer processors. Also, if the overlap in each direction is the same, and the data is evenly distributed in arrays or square local data subsets of the same size in every processor, the interprocessor link traffic is identical in every direction, thus optimizing the use of the link bandwidth.

In FIG. 7a, the local tile 150 data is shown with a grid hatch to illustrate that it is being output in both row wise and column wise fashion in all four directions. The areas left white show that these data areas are not output. In FIG. 7b, the local tile 152 is shown dotted and is not accessed, while the augmented data areas 154, 156, 158 and 160 are shown with horizontal or vertical lines to illustrate that either augmented rows or augmented columns are being written into those areas. Note that even though FIGS. 7a and 7b show inputs and outputs separately as if one processor inputs while the other outputs, in practice because of the DMA transfer capability both input and output occur simultaneously. An overlay of FIGS. 7a and 7b more accurately represents the concurrent operations in each processor 102.

The left data output pointer 162 must begin with the first column of the local tile data (shown with the black circle in FIG. 7a). After each column is output the column pointer is moved one column to the right, that is, the column pointer is incremented. The pointer 162 moves away from the neighbor to which the data is sent and thus in the opposite direction of the data flow. The corresponding data input on the right is stored beginning with the column after the right-most column of the local data (shown by the black dot in FIG. 7b) and the associated pointer 164 is moved one column to the right after each exchange, that is the column pointer is incremented. The pointer 164 moves toward the neighbor which is sending the data which is again opposite to the direction of data flow. The data output to the right begins with the last column of local tile data (just before the white dot representing the right output pointer 166 in FIG. 7a) and moves to the left (away from the neighbor receiving the data) after each exchange, that is, the column pointer is decremented, while the data input from the left is stored in the column just before the first local tile column (just before the white dot in FIG. 7b) and also moves to the left and toward the neighbor transmitting the data after each exchange.

The data output to the processor above or on top begins with the first row of local tile data, again shown beginning at the black dot, and the associated row pointer 170 moves down (away from the neighbor and in the opposite direction of the data flow) after each exchange, that is, the row pointer is incremented. The corresponding input from below begins with the row just below the last row of the local tile (shown by the cross hatched circle) and the associated pointer 172 also moves down (toward the neighbor sending the data) after each exchange. The data output to the processor below or at the bottom begins with the last row (just before the lightly dotted circle representing the bottom pointer 174 in FIG. 7a) and moves up (away from the neighbor below and again in the direction opposite to the data flow) one row after each exchange, that is, the row pointer is incremented. The corresponding input from above is stored beginning with the row just above the first row of the local data tile (one row above the white circle in FIG. 7b representing the above input pointer 176 and also moves up (toward the neighbor) one row after each exchange. Again, the arrow shows the direction of the data movement, while the pointer movement is in the opposite direction. In FIGS. 7a and 7b, the long thick arrows show the direction of the data output or input and in every case, the movement of the pointers themselves is in the opposite direction and is shown with short arrows.

As the exchanges proceed the local augmented data tile will obtain the needed data on each of its four sides. The rows and columns of data exchanged will be of the same width and height as the local tiles. As many exchanges as the size of the overlap in each direction must be performed. Note that the overlap (and number of exchanges) in each direction does not need to be the same, although the amount of data input on one side must equal the amount of data output on the other side. Each of the exchange pairs can proceed independently of all of the others because the DMA transfer capability provided by the preferred system.

This approach works as long as the overlap in any one direction does not exceed the local data tile size in the corresponding direction. If the overlap does exceed the local tile size (as in FIG. 5), a simple, multi-step extension of the procedure is necessary. To implement this extension, the data exchanges must first be synchronized, so that each processor is guaranteed that all the exchanges up to the local tile size in every direction have been completed. This synchronization is necessary to guarantee that the next group of exchanges will communicate data from areas which are filled with valid data. After synchronization, the exchanges can continue as they were using the current pointer positions. That is, because of the direction of pointer movement that has been chosen, the pointers for the next step of the exchange are in the proper positions and do not need to be reset. The data now being transferred is the data that had been received from the previous step. This step can be repeated as many times as necessary until the complete overlap is achieved in each direction. The data exchanges must be synchronized after every step and the number of row or column exchanges in any one step cannot exceed the number of rows or columns in the smallest local data tile in any processor. As before, if the data is overlapped the same amount in every direction, the link traffic is identical in each direction, optimizing the use of the link bandwidth.

Figure 8A:
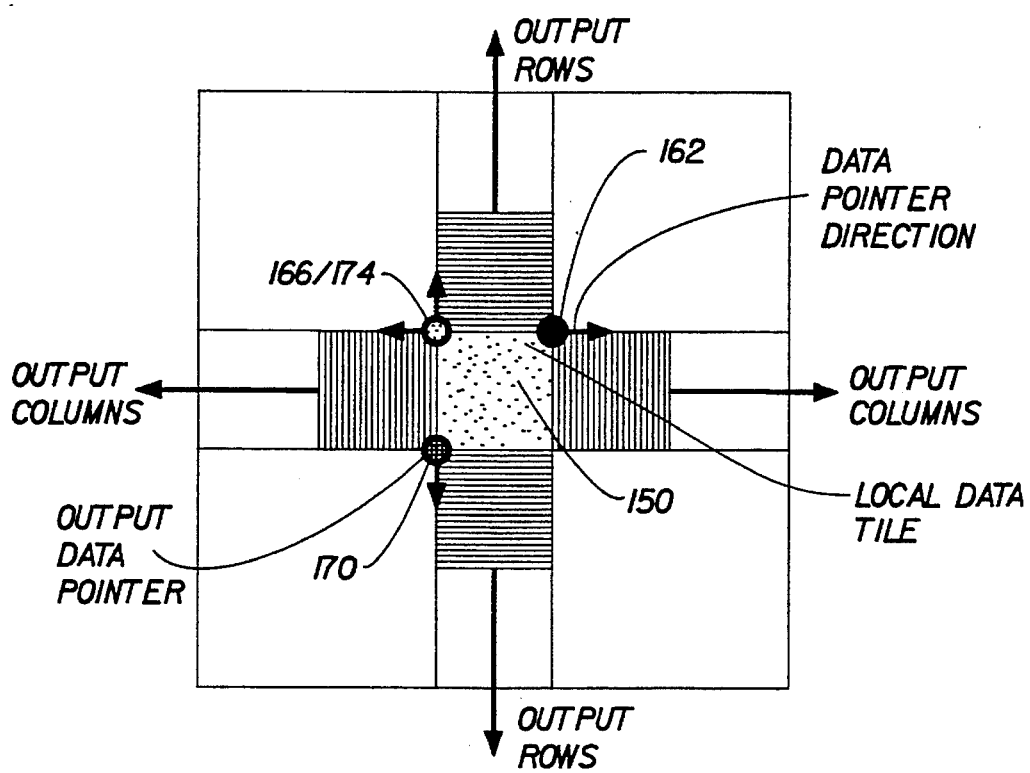
FIGS. 8a and 8b illustrate final positions of the output and input pointers after the first stage exchange.
Figure 8B:
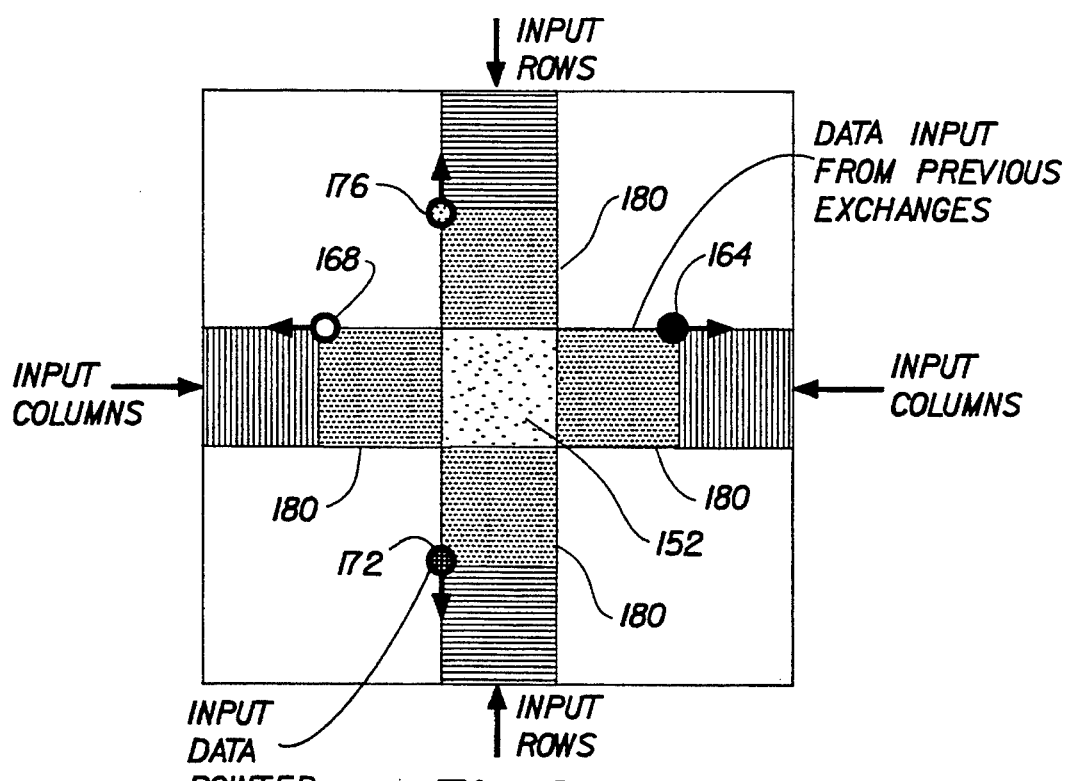

In FIGS. 8a and 8b, the circles represent the position of the row and column pointers 162, 164, 166, 168, 170, 172, 174 and 176 after the initial exchanges and just prior to the extended or second step of the first stage of exchanges. In FIG. 8a, the dotted area represents the original local data tile 150 which is not accessed in the extended exchanges. The areas marked with horizontal or vertical bars represent the areas where data will be output row wise or column wise. In FIG. 8b, the dotted areas 180 represent the original local data tile together with the first group of augmented data, none of which areas is used for input. The areas marked with horizontal or vertical bars represent the areas where data will be input or output row wise or column wise. As before, the large arrows represent the direction of data transfer or flow, the pointers themselves move in the opposite direction as shown by the small arrows.

In FIGS. 8a and 8b the white circles 168 and 166 represent the position of the input and output pointers for data going to the right and coming from the left, the black circles 162 and 164 represent the position of the pointers for data going to the left and coming from the right, the cross hatched circles 172 and 170 represents the position of the pointers for the data coming from below and going up, and the dotted circles 176 and 174 represent the position of the pointer for the data coming from above and going down (the dotted output pointer 174 is obscured or covered by the white circle). All of the pointers are incremented as before. At this point, FIG. 9 illustrates the augmented tile data elements for processor 5 using the same examples as in FIG. 5.

After the horizontal and vertical data exchanges have taken place, a second stage of exchanges fills in the corner data. At this point the corner data for each corner is stored in two neighbor processors. For example, the upper left corner data for the local processor is stored in both the processor above and the processor to the left. Thus, it is possible for the local tile to complete its augmentation by exchanging data only with the processor above and below (or to the left and right). This approach, however, does not optimize the use of the interprocessor links, since the remaining links are completely unused. To optimize the use of the links, data should be exchanged with every neighboring processor in precisely equal amounts. This is done as follows.

The upper left corner of data is row wise input from the processor above, the upper right corner of data is input column wise from the processor to the right, the lower right corner of data is row wise input from the processor below, and the lower left corner of data is column wise input from the left. At the same time, rows of data received from above at the first stage are sent left in columns, columns received from the right at the first stage are sent up in rows, rows received from below at the first stage are sent right in columns, and columns received from the left at the first stage are sent down in rows. Obviously, any symmetric rotation of these communication patterns will achieve the same object. However, it is not possible to send and receive particular corner data to and from the same processor or from the opposite processor. For example, the data received from above at the first stage cannot be sent left while the data needed for the upper left corner is received from the left. This impossibility will become clear when the problems with extending the overlap beyond the local tile size for the second stage is discussed below.

Figure 10:
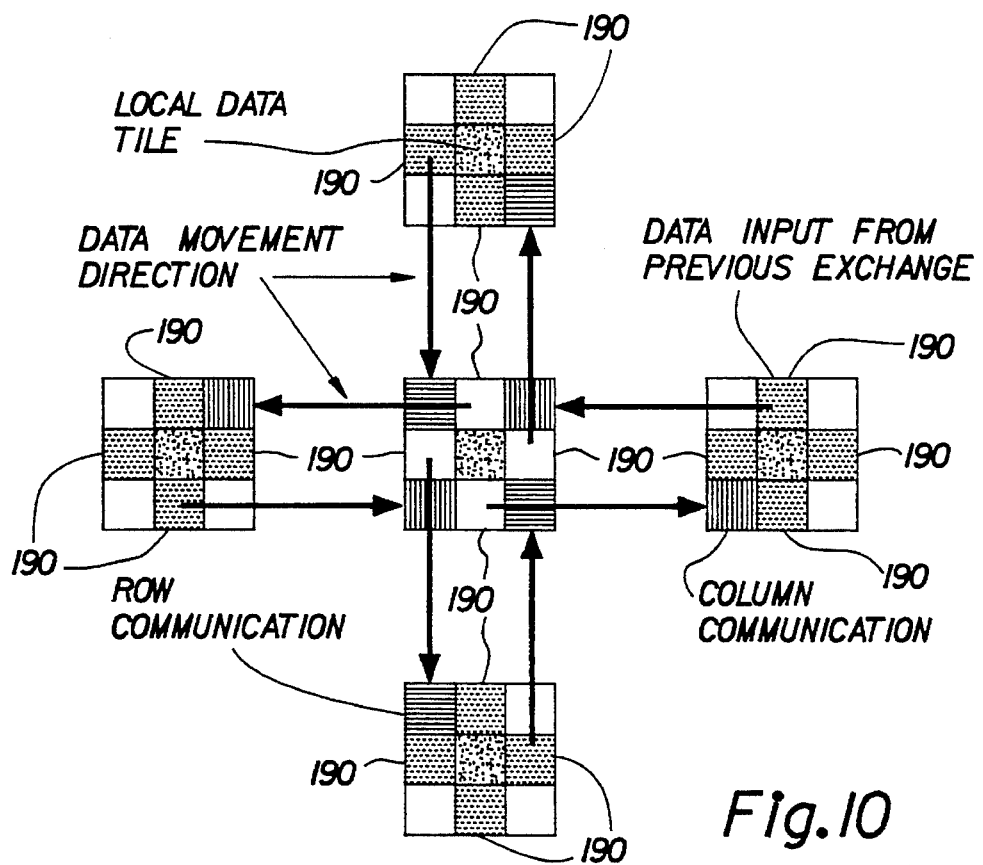
FIG. 10 depicts source and destinations for a second stage of the data set exchange.

These communications are graphically illustrated in FIG. 10. Dotted areas 190 represent valid data already received. Note that the left and right inputs and outputs are once again done column wise, and the up and down inputs and outputs are done row wise. The rows and columns of data sent are only partial rows and columns whose size is that of the data overlap in their respective directions. The data sent up are partial rows whose length is equal to the total overlap on the right, the data sent left ar partial columns whose length is equal to the total overlap on the left. The bars shown in the corner data areas represent whether the data are sent in row order (horizontal) or in column order (vertical).

Figure 11A:
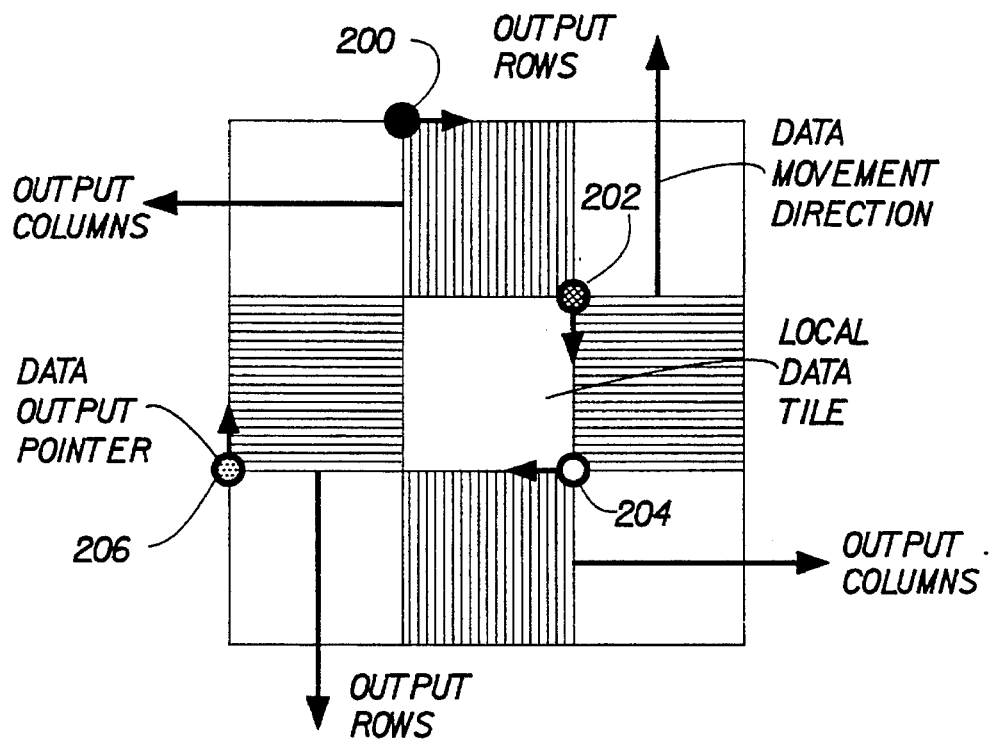
FIGS. 11a and 11b depict initial position and direction of movement of output and input pointers during the second stage exchange.
Figure 11B:
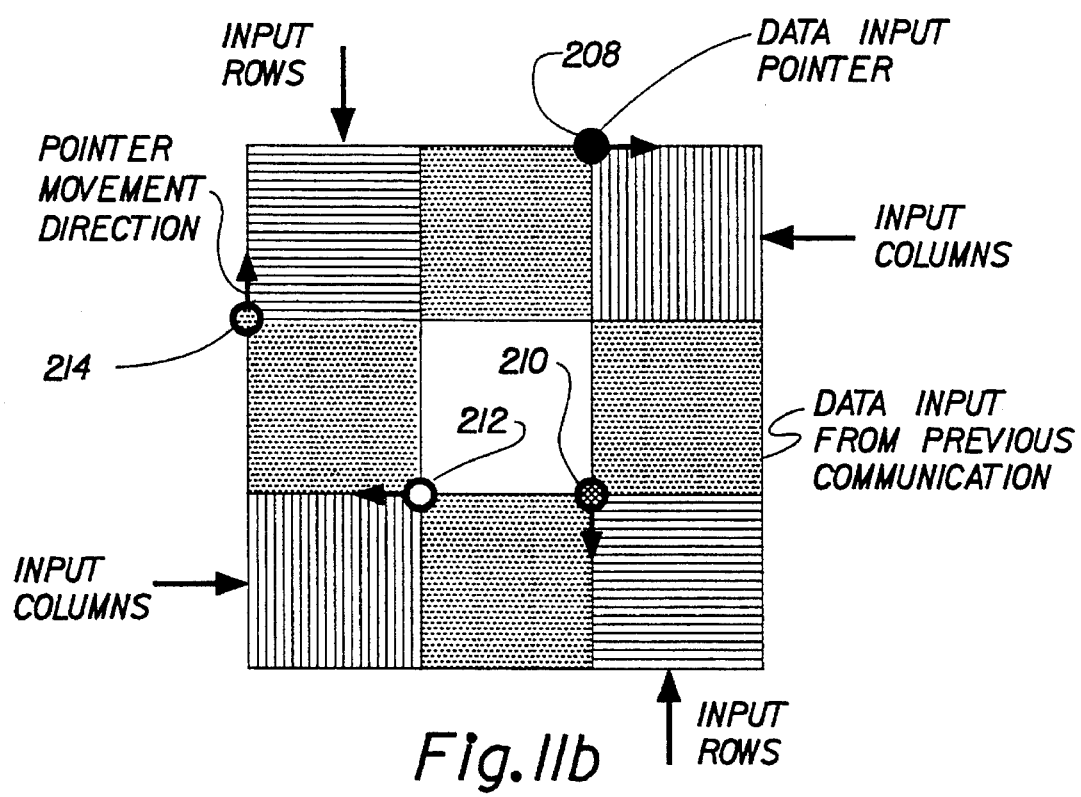

The output pointers 200, 202, 204, and 206 associated with each row or column are shown in FIG. 11a and the input pointers 208, 210, 212 and 214 are shown in FIG. 11b; the associated long arrows show the direction from which the data comes or goes while the short arrows show pointer movement directions. Again, the horizontal or vertical lines drawn in the figure represent graphically whether the data is sent row wise (horizontal lines) or column wise (vertical lines). The dotted circles 206 and 214 represent the initial position of the pointers to the data received from above and sent below and successive rows move up. The black circles 200 and 208 represent the initial position of the pointers to the data received from the right and sent to the left and successive columns move from the left to the right. The cross hatched circles 202 and 210 represent the initial position of the pointers to the data sent to the top from below and successive rows or lines move down. The white circles 204 and 214 represent the initial position of the pointers to the data received from the left and sent to the right and successive columns move from the right to the left.

If the overlap in each direction is the same, every communication will have the same amount of data, just as for the first stage communication. Thus, the link bandwidth utilization is optimized for all four links.

Figure 12A:
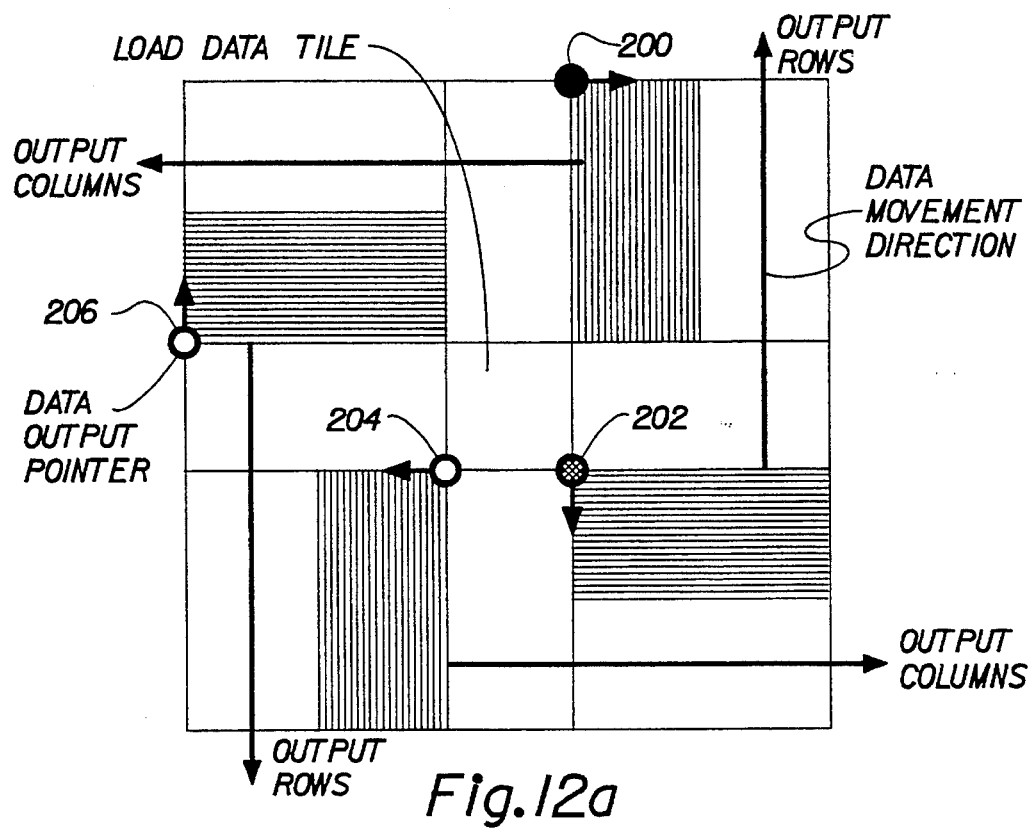
FIGS. 12a and 12b depict pointer positions after one step of the second data exchange.
Figure 12B:
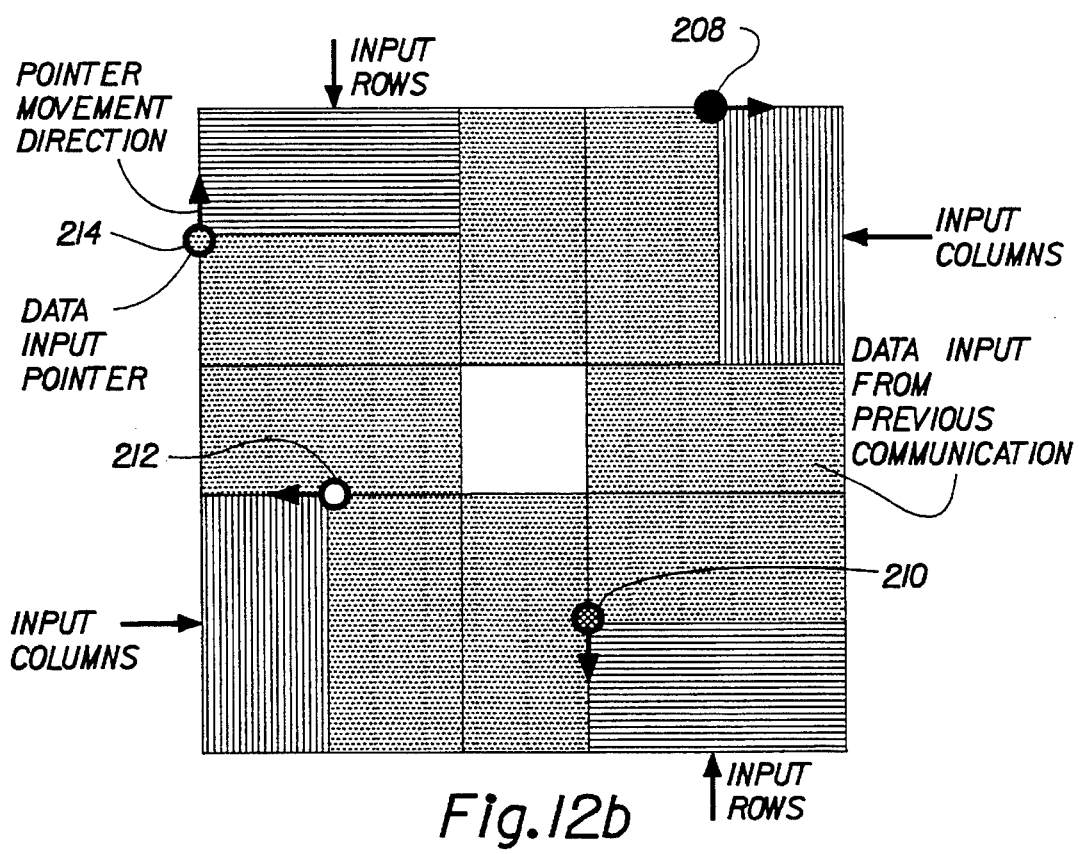

Once again, each of the four pairs of transfers (input and output) can proceed independently. If the overlap in any direction is less than the local tile size in the corresponding direction, the communications can be completed. If, however, the overlap is larger than the local size, the communications must be done in successive steps, as in the first stage. From FIGS. 12a and 12b it can be seen that a communication can proceed by itself as long as the number of rows or columns is not greater than the local tile size; if they are greater than the local tile size, the pointers will move into corner data areas which do not yet have valid data. To guarantee that data exists in these corner areas, the communications must synchronize after each step. After the synchronization, every corner area will be filled with rows or columns, up to the corresponding size of the local tile. This procedure can then be repeated. These steps are identical in concept to those of the first stage.

Figure 13A:
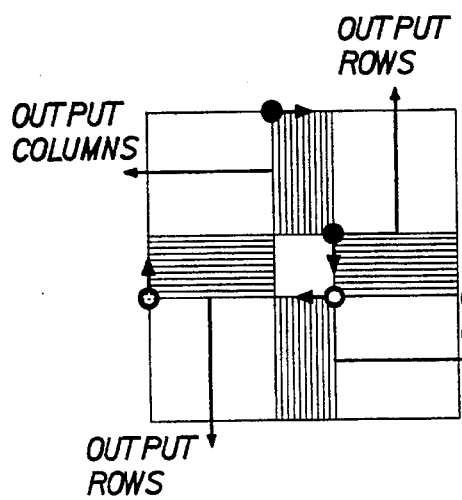
FIGS. 13a and 13d depict input and output pointer positions and movement directions during transfers which cannot proceed without error.
Figure 13B:
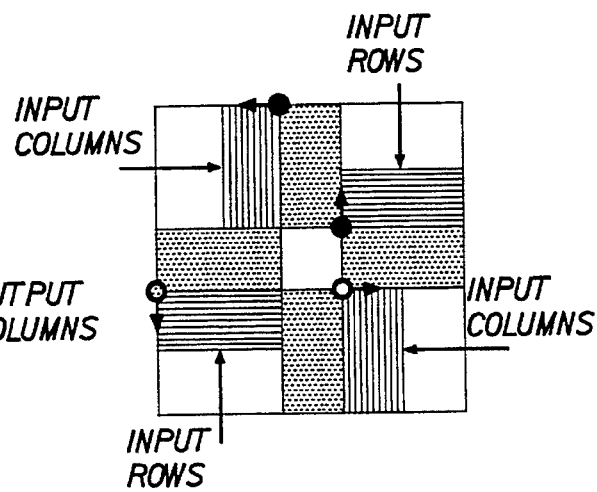
Figure 13C:
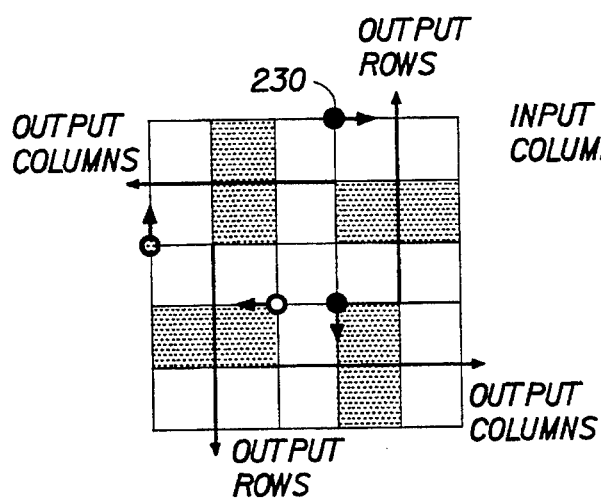
Figure 13D:
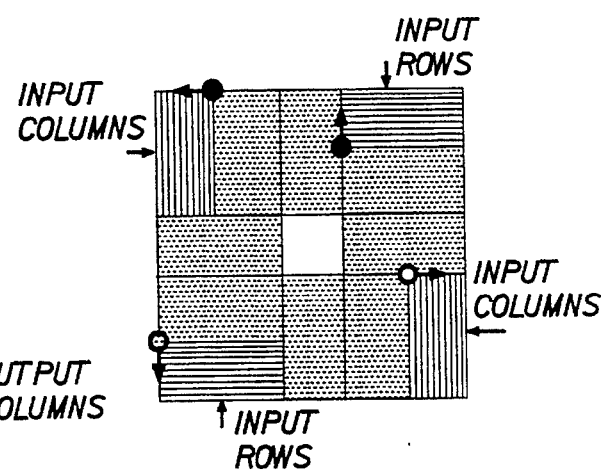

Again, all of the communications for each group of transfers are identical in size and proceed over all four links simultaneously. This guarantees that the links are used optimally. At the conclusion of these exchanges, the data tile augmentation is complete. Note that if one set of corner data was being exchanged, both input and output, with the same neighbor, this stage could not proceed. FIGS. 13a through 13d illustrates that this approach will not work. In FIG. 13a and 13b, the first transfers take place. The upper left corner data is input from the left and output to the left. The other three corners exchange data correspondingly. The second stage of transfers, however, cannot take place. The input pointers in FIG. 13d are shown together with the rows and columns that must be input. From FIG. 13c, however, we see that the corresponding outputs cannot be made because the full row or column is not present. For example, in FIG. 13c, the black circle 230 represents the position from which columns of data must be output to the left. But there are no valid completed columns of data to transfer. The area from which columns should be moved has rows of data instead. These rows fill only a portion of the data area needed. This same problem arises with every other output.

Figure 14:
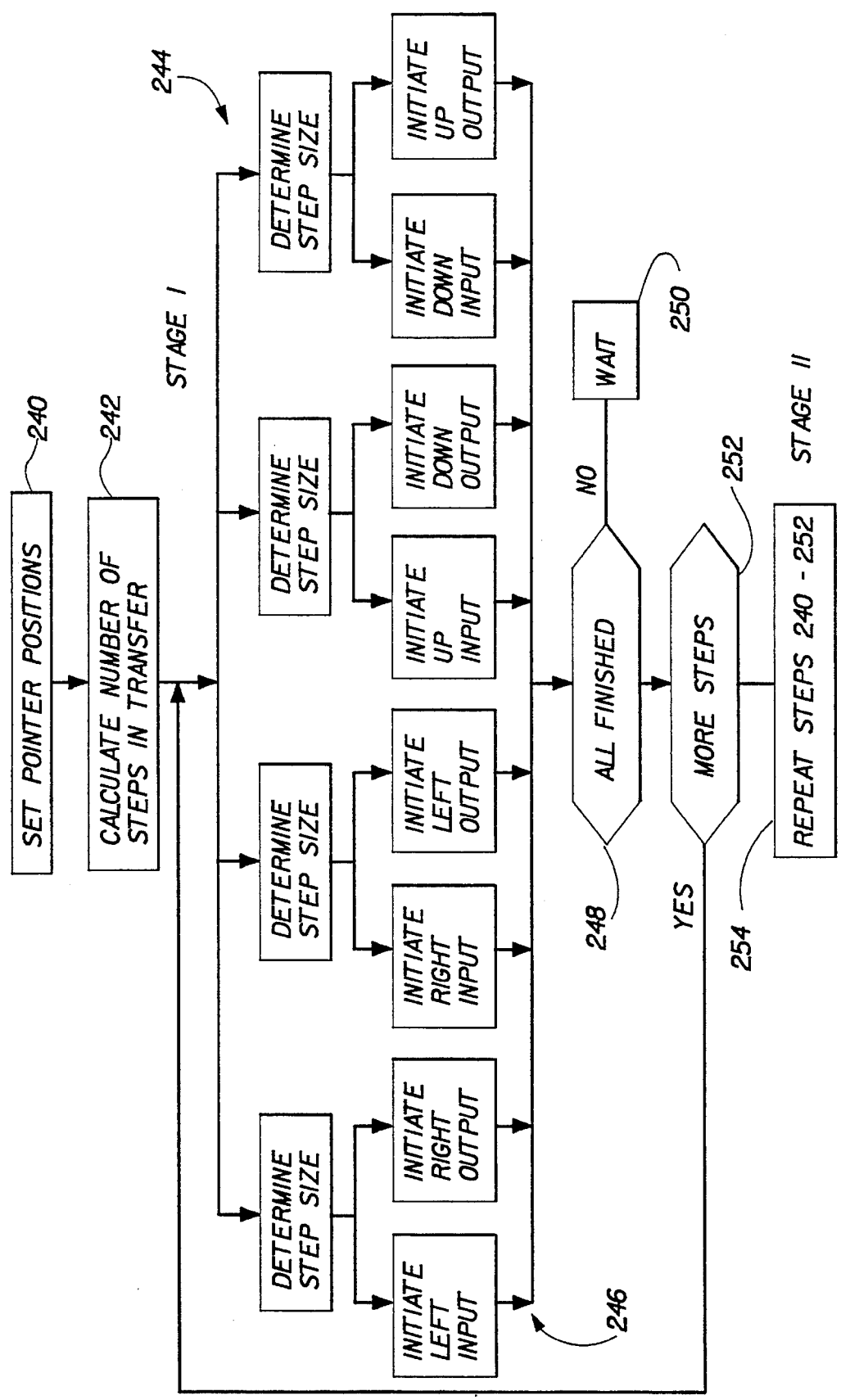
FIG. 14 illustrates the steps of the method of the present invention.

The process performed by the present invention, as illustrated in FIG. 14, has two stages, within each stage exists one or more steps which send local subsets and receive foreign subsets and within each step are included transfer operations which transfer the rows or columns designated in each step. At the beginning, once the data subsets have been loaded into the processors, each processor P(actually the main processor) positions 240 the input and output pointers as previously discussed. Then, the amount of overlap necessary for the operation to be performed, such as convolution, is determined and the number of steps (number of data subsets) and the size of each step (size of each data subset) to be transferred is calculated 242 from the amount of overlap. The number of steps is equal to the overlap divided by the maximum step size in each of the dimensions of the data set. The maximum step size is equal to the size of the smallest local subset. During transfers, if the step is not the last step, the stepsize is the maximum, and if the step is the last step, the step size is the overlap remainder which could equal the maximum step size. Once the size is determined, the conventional DMA transfers are initiated 246 by transferring the pointers and the data area sizes to the DMA channels. During the transfers the local rows and columns of data are transferred in a series of transfer operations and the pointers are updated as previously discussed. When all transfers are not finished 248 the main processor of each processor P continues to wait 250 for signals from the DMA processors indicating the transfers are complete. Once the first step, which transfers the local data subset, is finished, a determination is made 252 whether the foreign data subsets, adjacent or remote, of an extended transfer are to be transferred, that is, whether more steps are required. Once the first stage is complete, the process of steps 240–252 is repeated 254 in the second stage, only the initial positions of the pointers are different for the second stage, that is, the pointers are set to positions different from where they ended in the first stage. In this transfer the foreign data subsets received in the first stage are transferred.

The previous description describes both row and column tranfers being performed. However, it is more efficient, due to the physical arrangement of random access memory, to perform row transfers than column transfers. As a result, in a practical implementation the column transfers should actually be performed as transfers of row subsets of a group of columns, so that column and row transfers of the same size will finish at approximately the same time.

This invention provides a method for augmenting local data tiles of two-dimensional data sets on mesh-connected parallel computers without the use of additional storage and with optimal use of the four available interprocessor links. Given evenly distributed square tiles with the same overlap on each side of the local data tile, the data transfers over all four links are identical in size, occur simultaneously, and can be synchronized. This provides the maximum possible utilization of link bandwidth and memory.

It is possible to have the pointers initially positioned at different places and move in the opposite direction to that preferred, however, the pointers will have to be set to their proper position after each step, so that the transfer can continue.

The present invention has been described with respect to augmenting two dimensional data sets, however, it can be extended to one dimension data sets in a ring or linear array or to three or higher dimensional data sets arranged in a cube or higher dimensional form. Although the present invention has been described with respect to a system which includes four or more DMA channels it may be possible for this system to provide some efficiency improvements when only two processors are available for data transmission. The technique can possibly be used in single processor situations where the communication speed out of a buffer is much less than the processing speed of the processor.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of transferring two dimensional subsets of a two dimensional data set distributed over processors connected in an array which preserves the structure of the two dimensional data set, comprising the steps of:

(a) transferring a local data subset to neighboring processors and receiving and storing locally first foreign data subsets from the neighboring processors in a position related to the position of the neighboring processor from which the first foreign data subset was received; and (b) transferring the first foreign data subsets to the neighboring processors and receiving and storing locally second foreign data subsets from the neighboring processors, the second foreign data subsets being different from the local data subsets and the first foreign data subsets, each of the second foreign data subsets being stored in a position related to the position of the neighboring processor from which the second foreign data subset was received.

2. A method as recited in claim 1, wherein the first foreign data subsets comprise right, left, above and below subsets from a right neighboring processor, a left neighboring processor, an above neighboring processor and a below neighboring processor and step (b) comprises the simultaneous steps of:

(b1) transferring the right subset to the left neighboring processor;

(b2) transferring the left subset to the right neighboring processor;

(b3) transferring the above subset to the below neighboring processor; and (b4) transferring the below subset to the above neighboring processor.

3. A method as recited in claim 1, wherein the first foreign data subset comprises a first remote data subset and a second remote data subset, and wherein step (a) comprises the steps of:

(a1) transferring the local data subset to left, right, above and below processors;

(a2) receiving and storing locally left, right, above and below data subsets as first remote data subsets from the left, right, above and below processors;

(a3) transferring the remote data subsets to the left, right, above and below processors; and (a4) receiving and storing locally remote second data subsets from the left, right, above and below processors, and wherein step (b) includes transferring second remote data subsets to the neighboring processors.

4. A method as recited in claim 3, wherein input and output pointers containing an indication of a position within the foreign and local data subsets are modified so as to change the indicated position within the data subsets in a direction opposite to a direction of data transfer.

5. A method of data transfer between processors connected in an array while maintaining the overall organization of the data, each processor storing two dimensional subsets of a data set distributed over the processors, and data subset storage areas being arranged in an array with a center subset storage area and storage areas for side and corner subsets, the method comprising the steps of:

(a) transferring contents of the center subset storage area to one of the neighboring processors;

(b) receiving contents of a neighboring center subset storage area and storing the contents of neighboring center subset storage area in the side storage area;

(c) transferring contents of the side storage area to the one of the neighboring processors; and (d) receiving contents of a neighboring side subset storage area and storing the contents of the neighboring side subset storage area in the corner subset storage area.

6. A system, comprising:

an array of connected processing systems, said processing systems together storing a two dimensional data set and each of said processing systems storing a two-dimensional subset of the data set, each processing system being connected to a plurality of neighboring processing systems each of said processing systems comprising:

a main processor including a memory storing the two dimensional subset and for performing an array data operation; and data transfer processors coupled to the memory and each neighboring processing system to which the processing system is connected, and comprising:

means for transferring a local data subset to neighboring processing systems;

means for receiving and storing first foreign data subsets from the neighboring processing systems in a position related to the position of the neighboring processor from which the first foreign data subset was received;

means for transferring the first foreign data subset to the neighboring processing systems; and means for receiving and storing second foreign data subsets from the neighboring processing systems in a position related to the position of the neighboring processor from which the second foreign data subset was received.

7. A method as recited in claim 1, further comprising:

incrementing data pointers indicating a position of individual lines within a data subset when individual lines within a data subset are passed to a processor above the local processor;

decrementing data pointers indicating a position of individual lines within a data subset when individual lines within a data subset are passed to a processor below the local processor;

incrementing data pointers indicating a position of individual columns within a data subset when individual columns within a data subset are passed to a processor to the left of the local processor; and decrementing data pointers indicating a position of individual columns within a data subset are when individual within a data subset columns are passed to a processor to the right of the local processor.

8. A method as recited in claim 1, wherein each processor has a memory having a top, center, bottom, left, right, top left, top right, bottom left, and bottom right locations, the local data subset is stored in the center location and step (a) comprises the simultaneous steps of:

(a1) transferring the local data subset to the bottom location of the above neighboring processor;

(a2) transferring the local data subset to the top location of the below neighboring processor;

(a3) transferring the local data subset to the left location of the right neighboring processor;

(a4) transferring the local data subset to the right location of the left neighboring processor;

(a5) receiving and storing, as a first foreign data subset, the local data subset from the above neighboring processor in the top location;

(a6) receiving and storing, as a first foreign data subset, the local data subset from the below neighboring processor in the bottom location;

(a7) receiving and storing, as a first foreign data subset, the local data subset from the right neighboring processor in the right location;

(a8) receiving and storing, as a first foreign data subset, the local data subset from the left neighboring processor in the left location.

9. A method as recited in claim 8, further comprising:

performing the transfer of the local data subsets in steps (a1) and (a2) in a row-wise manner; and performing the transfer of the local data subsets in steps (a3) and (a4) in a column wise manner.

10. A method as recited in claim 8, wherein step (b) comprises the simultaneous steps of:

(b1) transferring the first foreign data subset in the top location to the top right location in the left neighboring processor;

(b2) transferring the first foreign data subset in the bottom location to the bottom left location in the right neighboring processor;

(b3) transferring the first foreign data subset in the left location to the top left location in the below neighboring processor;

(b4) transferring the first foreign data subset in the right location to the bottom right location in the above neighboring location;

(b5) receiving and storing, as a second foreign data subset, the subset in the left location from the above neighboring processor in the top left location;

(b6) receiving and storing, as a second foreign data subset, the subset in the right location from the below neighboring processor in the bottom right location;

(b7) receiving and storing, as a second foreign data subset, the subset in the top location from the right neighboring processor in the top right location; and 11. A method as recited in claim 10, further comprising:

performing the transfer of the foreign data subsets in steps (b1) and (b2) in a column wise manner; and performing the transfer of the foreign data subsets in steps (b3) and (b4) in a row-wise manner.

* * * * *